A. L. MORRISON.
HEADLIGHT GLASS.
APPLICATION FILED OCT. 30, 1916.
1,339,604. Patented May 11, 1920.
2 SHEETS—SHEET 1.
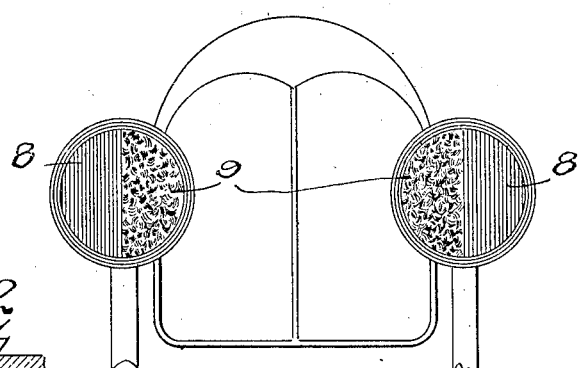
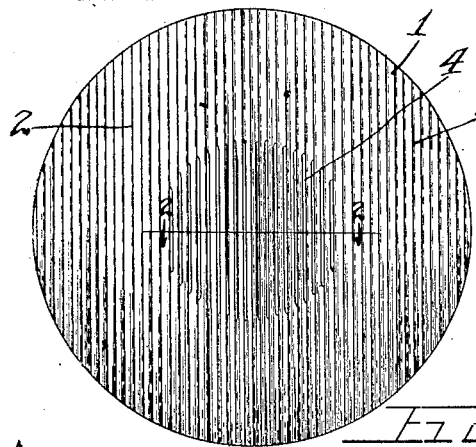
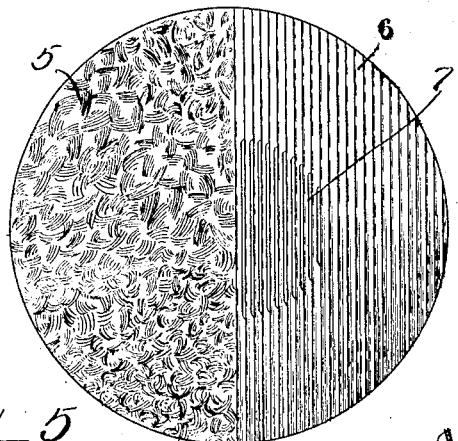
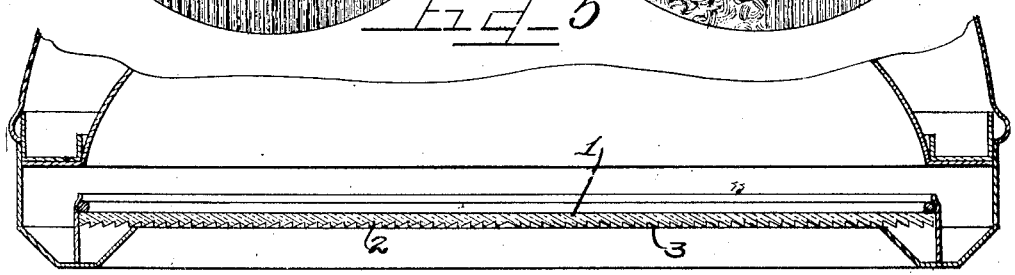

A. L. MORRISON.
HEADLIGHT GLASS.
APPLICATION FILED OCT. 30, 1916.
1,339,604.
Patented May 11, 1920.
2 SHEETS—SHEET 2.
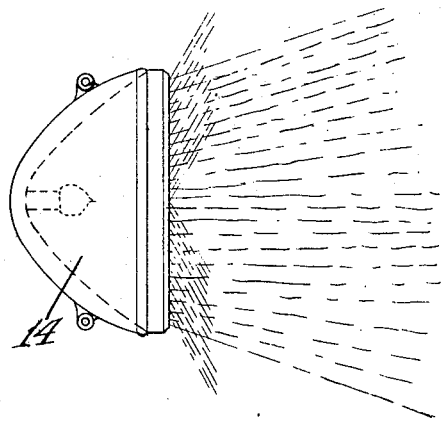
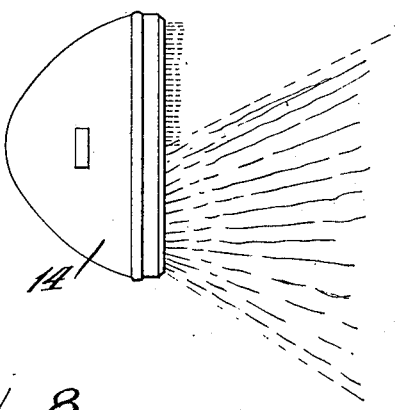
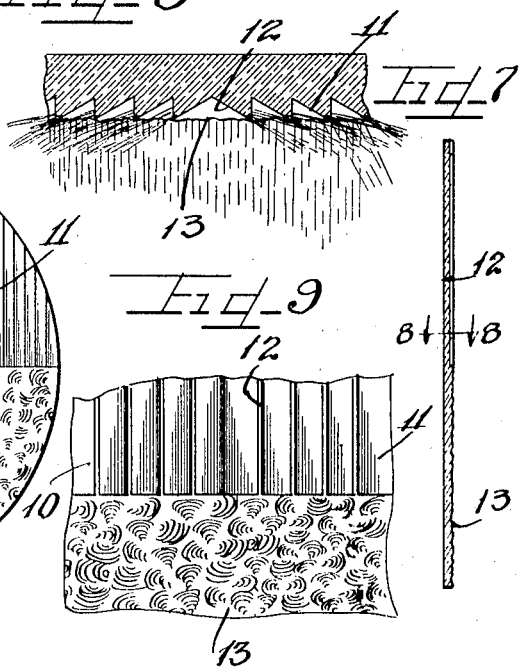
Witnesses
J. W. Angell
Charles W. Fills Jr.
Inventor
Abraham L. Morrison
by Charles W. Niles
Atty.

UNITED STATES PATENT OFFICE.

ABRAHAM L. MORRISON, OF DUBUQUE, IOWA.

HEADLIGHT-GLASS.

1,339,604.  Specification of Letters Patent.  Patented May 11, 1920.

Application filed October 30, 1916. Serial No. 128,389.

*To all whom it may concern:*

Be it known that I, ABRAHAM L. MORRISON, a citizen of the United States, and a resident of the city of Dubuque, in the county of Dubuque and State of Iowa, have invented certain new and useful Improvements in a Headlight-Glass; and I do hereby declare that the following is a full, clear, and exact description of the same, reference being had to the accompanying drawings, and to the numerals of reference marked thereon, which form a part of this specification.

This invention relates to an improved form of headlight glass particularly adapted for use on motor vehicles. Laws have been enacted almost universally against the use of bright, dazzling or glaring headlights on motor cars, and it is an object therefore of this invention to construct a headlight glass which will permit projection of a beam of light a considerable distance ahead upon the road without a glaring or dazzling effect upon the eyes of persons in range thereof, and a glass also acting to project a diffused light at a wide angle on each side of the road without glaring or dazzling effects.

It is an object therefore of this invention to construct a headlight glass designed to permit projection of a certain amount of the light directly ahead and to also distribute the light over a wide angle at the side of the road, the entire light however, having no glaring or dazzling effect upon an observer in the range of vision thereof.

It is furthermore an important object of this invention to construct a headlight glass provided with vertical corrugations or ribs having an angled surface, whereupon the light rays from the interior of the lamp striking the same, are distributed widely in a diffused state, and with certain portions of said corrugations or ribs polished and ground off at the edges of the ribs or corrugations to permit direct projection therethrough of a certain amount of light, the ground and polished corrugated glass, however, preventing a glaring and dazzling effect upon the eyes from the rays of light passing therethrough.

It is finally an object of this invention to construct a headlight glass or lens adapted to project the light both forwardly and to the sides of the road without a glaring or dazzling effect at any point in the range of illumination thereof.

The invention (in a preferred form) is illustrated in the drawings and hereinafter more fully described.

In the drawings:

Figure 1 is a front face view of a headlight glass constructed according to the principles of my invention.

Fig. 2 is a fragmentary detail section taken on line 2—2 of Fig. 1.

Fig. 3 is a view similar to Fig. 1, of a modified form of glass.

Fig. 4 is a diagrammatic view of a portion of the front end of a motor car illustrating lamps equipped with a headlight glass of another modified form.

Fig. 5 is a central horizontal section taken through a headlight equipped with the form of glass shown in Fig. 1.

Fig. 6 is a view similar to Fig. 1 of another modification of my invention.

Fig. 7 is a sectional view on line 7—7 of Fig. 6.

Fig. 8 is a detail section on line 8—8 of Fig. 7.

Fig. 9 is a fragmentary front view of the portion of glass shown in Fig. 8.

Fig. 10 is a diagrammatic top plan view of the rays of light from a lens glass such as shown in Fig. 6.

Fig. 11 is a side view similar to Fig. 10, showing the rays of light from a lens glass such as shown in Fig. 6.

As shown in the drawings:

Referring to Fig. 1, the circular plate of glass is denoted as a whole by the reference numeral 1, and the front or exterior surface thereof is provided with a series of vertical and parallel ribs or corrugations 2, and 3, respectively, the corrugations 2, disposed on the left half of the glass and the corrugations 3, on the right half thereof.

As clearly shown in Figs. 2 and 5, the corrugations 2, each have a perpendicular left hand surface and an inclined right hand surface, and similarly the corrugations 3, each have a perpendicular right hand surface and an inclined left hand surface. The series of corrugations 2, operate to diffuse and distribute a part of the light to the right side of the road, and the corrugations 3, serve similarly to diffuse a portion of the light to the left hand of the road.

At the central portion of the headlight glass, that is, the shaded portion denoted by the reference numeral 4, in Fig. 1, the sharp edges of the respective corrugations 2 and 3, are ground down, as clearly shown in Fig. 2, affording a clear polished flat surface on each corrugation or rib which is parallel to the plain back or rear surface of the glass. This feature is to permit projection therethrough of a certain amount of light directly ahead upon the road, and due to the fact that the rays of light which are thus projected diagonally ahead, pass through what is in fact a series of slits, no glaring effect results, and yet an effective illumination is obtained.

In the form of device illustrated in Fig. 3, one half of the surface of the glass is chipped so as to be substantially translucent, as denoted by the reference numeral 5, and the other half is provided with vertical corrugations or ribs, which at the semi-circular central portion of the glass are ground down, as denoted by the reference numeral 7, similar to the construction previously described.

In the form of device illustrated in Fig. 4, I have shown two similarly constructed headlight glass lenses, which are exactly similar in construction except that one is adapted for use on the right of the car and the other on the left thereof, and each at its outer semi-circular portion is provided with a series of vertical corrugations or ribs 8, similar to the corrugations 2, shown in Fig. 1, and at its inner semi-circular portion, the glass is chipped or translucent, as denoted by the reference numeral 9, similar to the portion 5, of the modification shown in Fig. 3. In Figs. 6 to 9, inclusive, I have shown another form of lens glass having the upper semi-circular portion thereof vertically corrugated with right and left corrugations 10 and 11, respectively, similar to the corrugations 2 and 3, of Fig. 1, and with the central portion thereof ground off as denoted by the reference numeral 12. The lower half of the glass 13, is chipped or made translucent in any suitable manner. In Figs. 10 and 11, I have shown the lens glass above described mounted in a headlight 14.

The operation is as follows:

In the form of glass illustrated in Figs. 1, 2 and 5, the rays of light are distributed or diffused over a wide angle on each side of the glass by the angled corrugations 2 and 3, and those rays, striking the ground-off portion 4, of the respective corrugations or ribs 2 and 3, are projected forwardly or ahead upon the road, but the entire glass transmits the light without a dazzling or glaring effect upon the eyes of a person within range thereof.

In the form of glass illustrated in the modification in Fig. 3, that portion of the light falling upon the chipped portion 5, of the glass, is merely diffused, the greater portion thereof, passing directly ahead upon the road, but entirely without glaring effect, while that portion of the light striking upon the corrugated portion 6, is diffused and distributed at a wide angle at one side with the exception of those rays which strike through the ground polished portion 7, of the corrugations 6. These rays are projected ahead with considerable brilliance, and yet without glaring or dazzling effect on the eye.

In using the form of glass illustrated in Fig. 4, the road on each side of the vehicle upon which the headlights are mounted is illuminated by distribution of the rays of light by the corrugated portions 8, while the central portion of the road or that directly ahead of the vehicle is brilliantly illuminated by the light which progresses through the chipped portion 9, but the entire illumination from the lens is without dazzling effect or glare.

As shown clearly in Figs. 10 and 11, the form of lens glass shown in Fig. 6, effects a distribution of light on both sides of the headlight through the corrugated portions of the glass, as well as a projection of light directly ahead through the translucent portion of the glass and ground-off surfaces of the central corrugations. It is immaterial which surface of the glass is on the exterior of the headlight as the corrugations may be formed on the inner surface and angled properly so as to effect a distribution of the light in the manner described.

I am aware that various details of construction may be varied through a wide range without departing from the principles of this invention, and I therefore do not purpose limiting the patent granted otherwise than necessitated by the prior art.

I claim as my invention:

A lens of the class described having perpendicular right and left ribs for approximately half the diameter of the lens, certain of said ribs having a portion of the edges thereof adjacent the center of the lens ground to permit direct transmission of light therethrough, and the lens provided with a chipped face on the other half opposite the ribs.

In testimony whereof I have hereunto subscribed my name in the presence of two subscribing witnesses.

ABRAHAM L. MORRISON.

Witnesses:
 CHARLES W. HILLS, Jr.,
 EARL M. HARDINE.